United States Patent [19]

Ackley

[11] Patent Number: 4,555,047
[45] Date of Patent: Nov. 26, 1985

[54] AUTOMATIC TOOLCHANGER TAPPING LUBRICANT DISPENSER

[75] Inventor: Harry E. Ackley, Sardinia, Ohio

[73] Assignee: Cincinnati Milacron Inc., Cincinnati, Ohio

[21] Appl. No.: 524,756

[22] Filed: Aug. 19, 1983

[51] Int. Cl.⁴ .............................................. B67D 5/40
[52] U.S. Cl. .................................. 222/192; 222/259; 222/260; 222/321; 222/378; 222/388; 184/105.1; 408/56
[58] Field of Search ............... 222/319, 386, 388, 192, 222/256, 257, 259, 260, 321, 341, 378, 514; 184/105 R, 105 A, 105 B, 105 C; 408/56, 60, 61; 409/135, 136; 92/129, 181 P; 901/30, 50

[56] References Cited

U.S. PATENT DOCUMENTS

| 1,628,624 | 5/1927 | Liverance, Jr. | 222/378 |
| 1,912,770 | 6/1933 | Hartman | 184/105 |
| 2,217,736 | 10/1940 | Ehnts | 184/105 B |
| 2,443,981 | 6/1948 | Funk et al. | 222/259 |

FOREIGN PATENT DOCUMENTS

0676911 6/1939 Fed. Rep. of Germany ...... 222/259

Primary Examiner—Joseph J. Rolla
Assistant Examiner—Nils E. Pedersen
Attorney, Agent, or Firm—Daniel P. Worth

[57] ABSTRACT

A tapping lubricant dispenser apparatus is provided for use in numerically controlled automatic toolchanger machining systems to dispense tapping lubricant into a previously drilled hole before tapping. The tapping lubricant is usually a viscous tapping compound of the consistency of paste, grease or the like. The apparatus includes a toolholder of the type to fit into the machine spindle, a reservoir for a supply of lubricant—typically sufficient to run unattended for several complete cycles, e.g. at least one shift—and a reciprocating pump that dispenses the lubricant responsive to actuation by the numerical control system when the toolholder of this apparatus is fitted into the machine tool spindle. The reservoir reloads the pump after each dispensing action. The numerical control and toolchanger system is programmed to select the apparatus, put it in the spindle, align same with the hole to be tapped, and causes pump reciprocation and dispensing and then remove the apparatus from the spindle. Usually a drilling program is employed whereby the motion to advance the drill into a hole instead advances this apparatus thereby placing in the hole a body of lubricant.

11 Claims, 12 Drawing Figures

AUTOMATIC TOOLCHANGER TAPPING LUBRICANT DISPENSER

This invention relates to an automatic toolchanger tapping lubricant dispenser. One aspect of the invention relates to a dispensing means. An aspect of the invention relates to a dispensing means for dispensing tapping lubricant in a numerically controlled automatic toolchanger system. An aspect of the invention relates to means for dispensing a viscous fluid, preferably in a metered or measured quantity.

Producing a tapped hole in a metal body requires the metalcutting operations of drilling followed by tapping. Numerically controlled (NC) automatic toolchanger tapping has evolved a problem of automatically providing a lubricant as part of the tapping operation in an unmanned operation desirably by placement of tapping lubricant in the hole before tapping as automatically and as reliably as other NC operations.

Failure to provide proper tapping lubricant leads to reduced tool life of the tap, increased danger of tap or tool breakage in the hole requiring an expensive manual operation to remove same, poor finish on the threads, quality loss as the tap rapidly dulls, and related problems. One attempted solution to tapping lubrication, especially when cutting in steel, has been to direct cutting fluids at the vicinity of the tapping operation and hope enough gets into the hole along the flutes of the tap to achieve some lubrication. In some instances, the NC program calls for increased cutting fluid or coolant volumes during tapping. This is at best partially satisfactory because the fluid concerned is not delivered sufficiently within the hole where the tapping is going on. Furthermore, the preferred lubricant for tapping steel has the consistency of grease or paste and heretofore has been used in tapping by manual placement within the hole prior to tapping. Such substance may be a commercially available tapping lubricant such as that sold under the brand name CIMTAP and manufactured by Cincinnati Milacron Industries, Inc. or a sulphur based lubricant called "Yellow Number 5" commercially available from Sulflo Concentrate, North Tonawanda, N.Y.

The present invention provides a dispenser or lubricator that as part of a NC program automatically places a body of tapping lubricant of the desired kind within the hole prior to tapping, normally placing same between drilling and tapping operations. By so delivering this body of very viscous fluid within the hole, the fluid moves down the hole with the tap and lubricates in the immediate vicinity of the actual thread forming operation. The present invention includes a lubricator and a toolholder that is manipulated as one of the tools by the toolchanger. Lubricating with the present invention is preferably done by repeating the drill instructions of the NC whereupon the tapping lubricant is delivered in measured quantity within a hole by pressing together the instant lubricator and the workpiece having a hole to be tapped and then repeating the same for each hole as required by the NC program. When all the holes have been lubricated, the toolchanger removes the present apparatus, replaces it with a tap, and proceeds to tap in accordance with the NC program.

The present invention provides an apparatus for applying tapping lubricant, useful and handled as a tool in a numerically controlled automatic toolchanger system which comprises toolholder means combined with a reservoir of a size sufficient to store lubricant for many operations, e.g., a quantity for four hours or possibly even an entire eight hour shift, a dispensing means including a dispensing pump actuated by reciprocation of the apparatus relative to the workpiece, and means to transfer material into the pump means from the reservoir.

Other objects, advantages and features of the invention may be realized by the reader from this specification when read in conjunction with the annexed claims and drawings wherein:

Numerically controlled (NC) automatic toolchanger machining systems are by this time well-known in the state-of-the-art. The following references teach NC controlled automatic toolchanger systems, are representative, and expressly incorporated herein by reference—U.S. Pat. No. 3,990,585 "Article Exchange Mechanism", U.S. Pat. No. 3,803,704 "Machine Tool", and U.S. Pat. No. 3,719,987 "Toolchange Apparatus".

Figure 1:
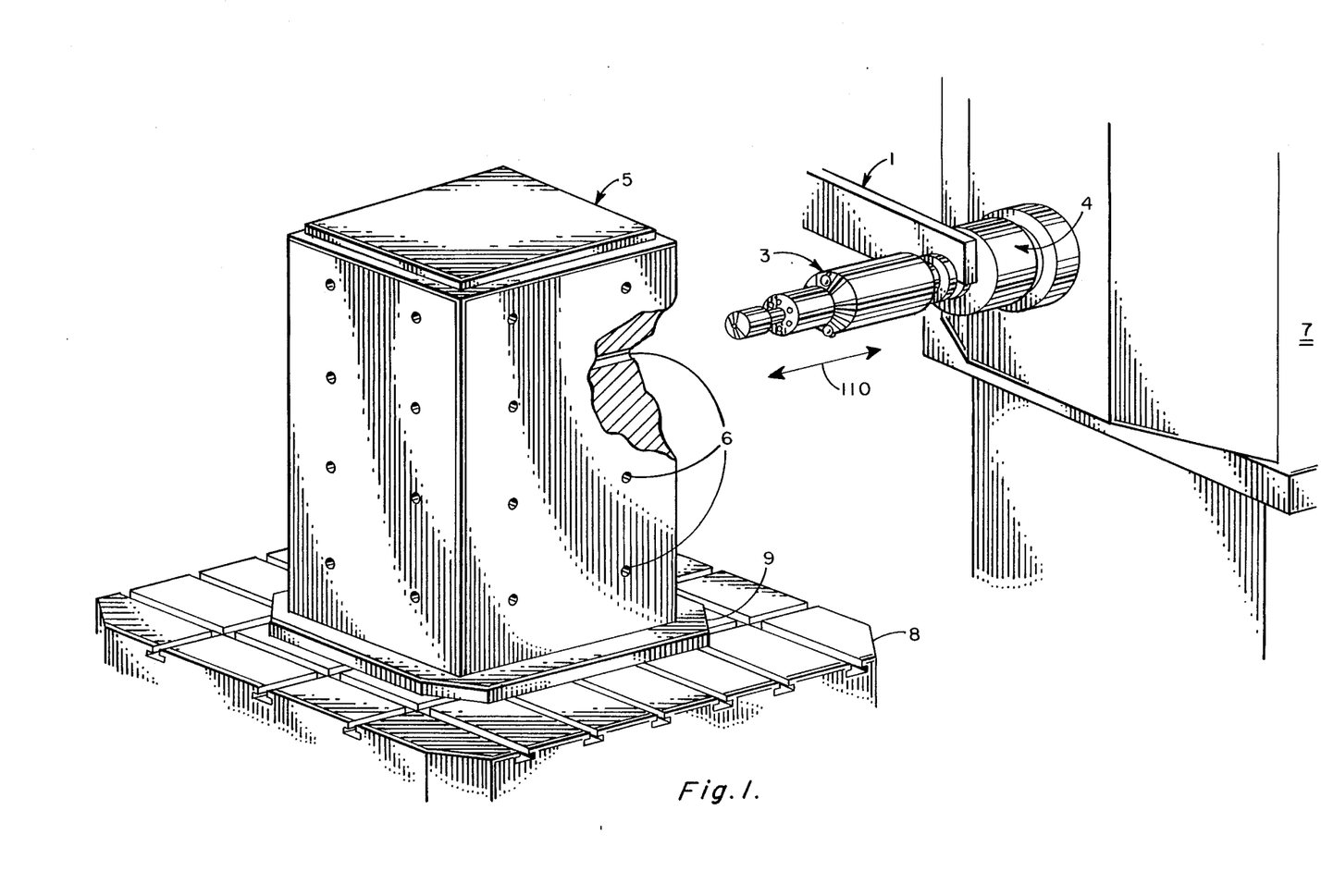
FIGS. 1 and 1A are schematic perspective views in pertinent part of an apparatus according to the invention being placed by a toolchanger arm into a rotating spindle in working relationship with a partly cutaway workpiece mounted on the machine tool pallet or worktable.
Figures 1A, 5:
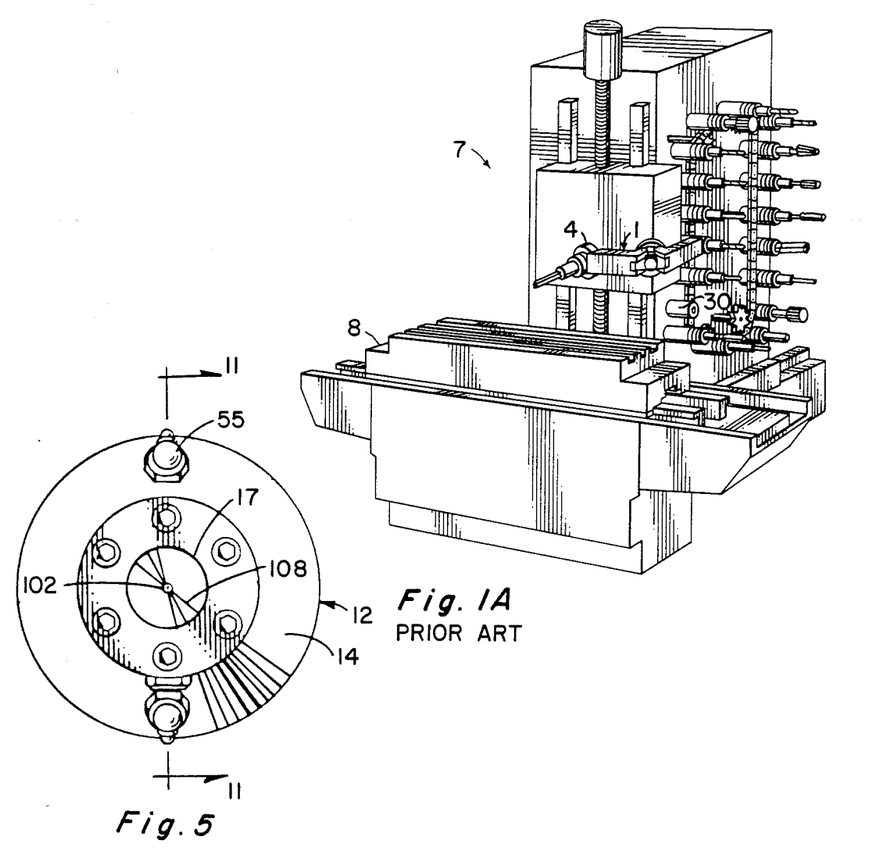
FIGS. 5, 6, and 7 are sections through the apparatus of FIG. 2 as seen on sections 5—5, 6—6 and 7—7, respectively.
Figure 2:
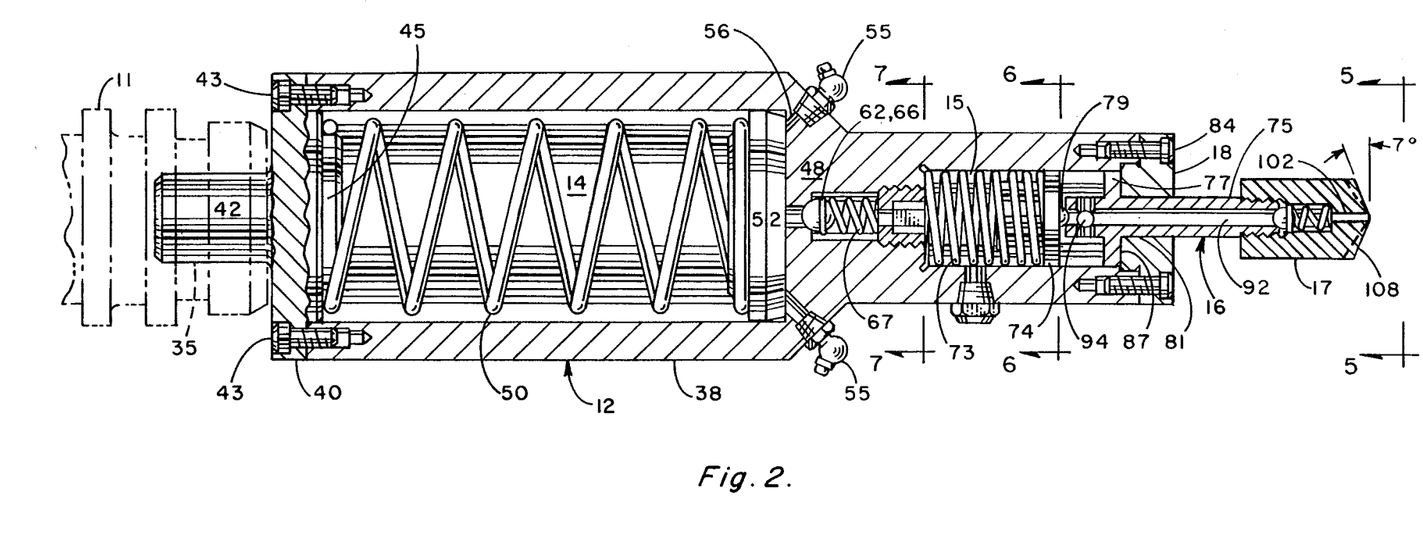
FIGS. 2 and 3 are cross-sectional side views of an apparatus according to the invention with no lubricant in the reservoir and when fully charged with lubricant, respectively.
Figure 4:
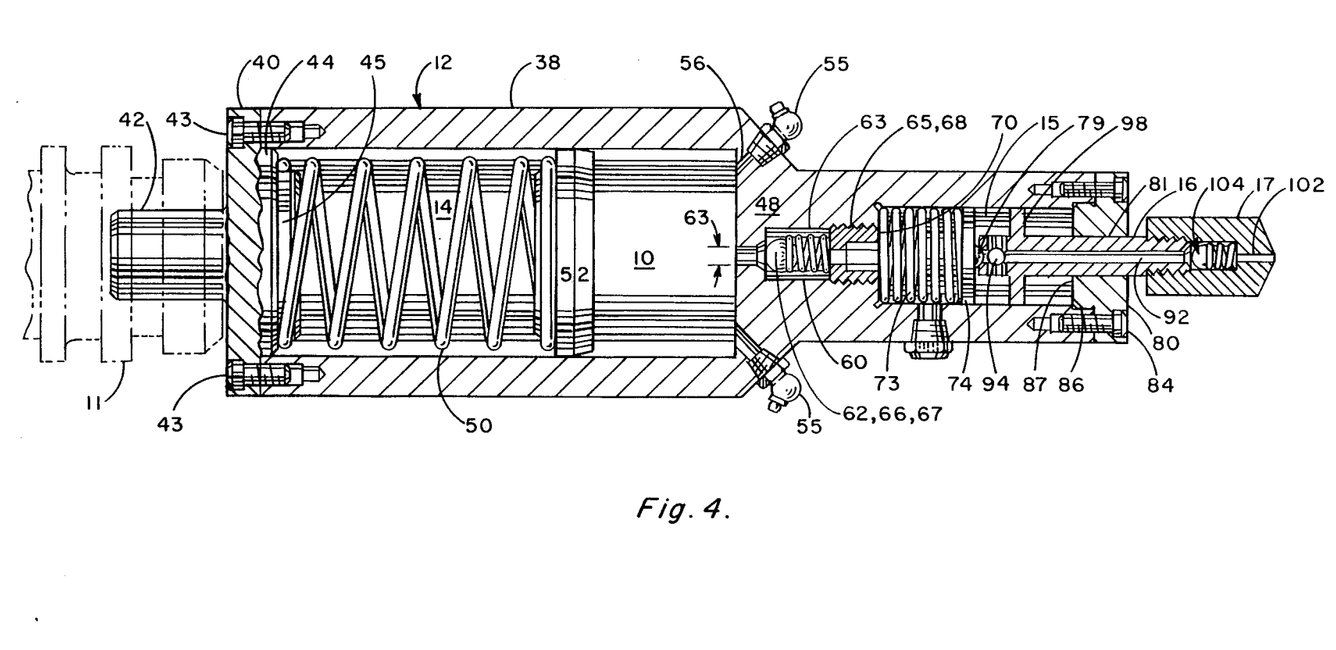
FIG. 4 is similar to FIGS. 2 and 3 but shows the parts as positioned when dispensing (e.g. check valves upon)

Referring first to FIGS. 1 and 1A, there is shown in pertinent part the toolchanger arm 1 in the position where it is inserting a lubricator apparatus 3 according to the present invention in the machine tool spindle 4 (or removing same from the spindle, as the case may be) in juxtaposition with the workpiece 5 having a plurality of holes 6, some on each side, which have been drilled and are now to be tapped. The workpiece 5 is, of course, mounted by conventional means (T-bolts, clamps, etc.) on the worktable 8 or on a pallet 9 associated with the worktable of the machine tool 7. The machine tool spindle 4 may at this time be still, i.e., not rotating, or it may be or remain rotating from the previous cycle. In the preferred embodiment, the machine tool spindle 4 is still rotating (called a live spindle) because rotational power is still applied thereto and once the instant dispensing apparatus 3 is secure in the spindle, the NC system moves the dispenser and workpiece relative to each other, finally pressing them together and causing a body 10A of lubricant 10 (see FIG. 4) to be dispensed into the hole 6 to be tapped. Dispenser 3 and workpiece 5 are then moved apart. The operation may then be repeated on other holes. Then the toolchanger arm 1 removes the instant tapping lubricator 3 replacing it with a tap and the tapping operation is commenced. The instant lubricator as well as other tools (drill, tap, endmill) are drawn from and returned to a tool store or tool matrix (not shown).

The dispensing apparatus 3 includes as seen in FIGS. 1-4, 10 a toolholder 11, an elongated housing assembly 12 secured to said toolholder and defining a reservoir 14 at the end adjacent the toolholder; a pump chamber 15; and a pump plunger assembly 16 and its outermost dispensing end tip assembly 17 extending out of the housing 12 at the end 18 of the apparatus remote or opposite from the toolholder. The toolholder 11 illustrated is preferably one of the well-known (see ANS1 specification B-5.10 "Machine Tapers" and B-5.18 "Spindle Noses and Tool Shanks . . . ") kinds having a tapered or frusto-conical spindle-engaging surface with the drawbar stud and clamping groove at the distal end for locking into the spindle, a pair of spaced-apart flanges with (usually) face keys (not illustrated) and locating surfaces thereon. Other toolholder structures for NC are embraced within the present invention, e.g. cylindrical spindle surface. The tool end the toolholder has recess 35 to receive the mounting shank. A set screw 36 is provided to lock the two together. The toolholder construction shown is a conventional construction of the kind used to hold an end mill cutting tool or the like.

The housing assembly preferably comprises a body 38 of a one-piece aluminum casting that contains the reservoir 14 and pump chamber 15 and which is sealed at toolholder end by a cap 40 from which the mounting shank 42 extends into the toolholder recess 35. The cap 40 is secured in place to the housing by a plurality of bolts 43 preferably of the allen head type and has a stepped profile that provides a sealing surface 44 that engages the inner wall of the reservoir and a spring boss 45. The housing body interior defining the reservoir 14 is a hollow circular and cylindrical member that ends at a partition 48 which separates it from the pump chamber 15 on the opposite end of the housing. Within the reservoir is a reload biasing means, preferably a helical mainspring 50 with closed ground flat ends, one of which is located by being positioned around the spring boss 45 and the other end of which engages the backside of a reloading piston 52 which likewise has a piston spring boss on its back face. The reloading piston 52, of course, is a cylindrical member having a sliding fit within the reservoir and serves the function of pushing tapping lubricant 10 from the reservoir into the pump chamber 15.

Tapping lubricant 10 is pumped into the reservoir through the ordinary grease fitting 55 of the kind made the Zerk Company and commonly found on automobiles and other such places. The grease fitting 55 is secured in one end of a filling passage 56 formed in the housing in the region immediately adjacent the partition 48. There may be more than one grease or filling fittings provided.

The partition 48 has formed therein an exit passage 60 in which is situated a first check valve means 62 to prevent flow from the pump chamber back in the reservoir but to permit flow upon a pressure rise from the reservoir into the pump chamber. Preferably exit passage 60 is formed to have at least diameter 63 in the end communicating with the reservoir, a tapered seat 64 to cooperate with the ball check, and a threaded end 65 adjacent the pump chamber. Check means 62 is a spring 66 and ball 67 are positioned within exit passage 60 and retained there by a plug 68 screwed into place and through which a passage is likewise bored. A hexagonal recess 69 for receiving an allen wrench or the like is preferably provided in the plug so that a flush surface 70 is provided at the end of the pump chamber.

The pump chamber 15 is a much smaller recess formed in the housing and contains a pump bias means comprising helical pump spring 73 with ground flat ends and a spider 74 to support one end of the pump spring, a pump plunger 16 consisting of a hollow tube 75 combined with a piston or support flange 77, and a thrust bearing assembly 79 in the form of a steel ball (also numbered 79) to support the pump plunger against the spider. The pump chamber is closed by a pump closure cap 80 with an opening or bearing 81 in which the pump plunger tube is revolvably supported. The pump plunger 16 can also reciprocate relative to the cap and along the axis 83 (FIGS. 3, 10) of the dispensing assembly. The cap 80 is held in place by a plurality of bolts 84 extending into the housing wall through the outermost flange of the cap. The chamber side of cap 80 contains a pilot shoulder 86 and a sealing surface 87. The housing walls are suitably contoured to receive both the pump cap and the reservoir cap.

Figure 6:
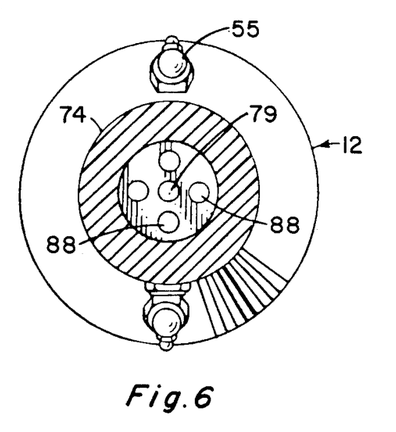
Figure 7:
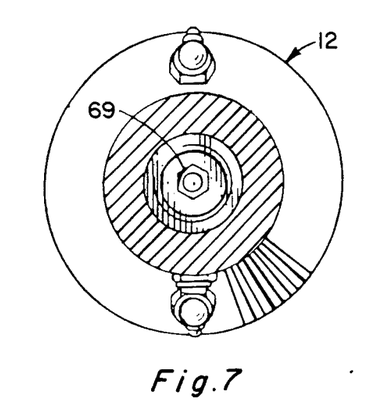
Figure 11:
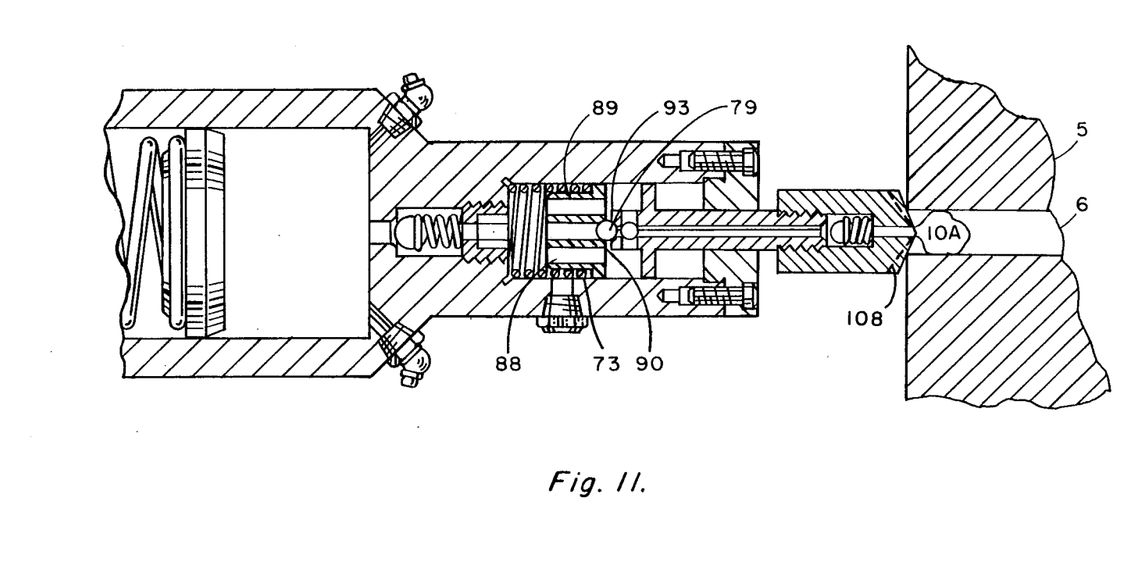
FIG. 11 is a thrust bearing detail along section 11—11 of FIG. 5.

The spider 74 (FIG. 6) is a disc with holes 88 and a central hole that provides thrust bearing 79 and pump spring 73 support. As shown, it is a flanged disc having a pump spring locating boss 89 on one side and a centrally located thrust bearing recess 90 (FIG. 11) on the other. The thrust bearing recess conveniently comprises a hole drilled through the spider and countersunk to provide tapered shoulders to receive the ball.

The pump plunger comprises 16 (FIGS. 6, 11) hollow tube 75 with a longitudinal passage 92, the innermost end 93 of which is likewise countersunk to provide thrust bearing shoulders. Immediately adjacent the thrust bearing a plurality of holes 94 are drilled through the walls of this tube into the central longitudinal passage 92 so that grease can flow into the passage 92 and out through the tip 17 as described elsewhere herein. Secured to a central portion of the pump plunger 16 is the piston 77. Preferably, it is machined in one piece with the tubular body of the plunger, but it could be made of a separate member and secured to tube 75. The outboard end of piston 77 is ground or otherwise well-finished on the periphery 98 of its outboard face to provide a good sealing surface in cooperation with the opposite situated sealing face 87 on the pump closure cap.

Pump chamber 15 has a relief passage 99 fitted with a relief valve 101 at its mid-portion to eliminate lubricant in event of a malfunction.

The dispensing tip 17 preferably comprises a machined nylon member of generally cylindrical shape having a dispensing passage 102 (FIGS. 3-6) therethrough and a second check valve 104 located in said passage to permit flow out through the tip from within the pump chamber. Check valve 104 is preferably a spring and ball check located in an enlarged portion of the passage and sealing against the end of the pump plunger 2. As illustrated, the tip 17 is threadedly secured to the pump plunger with passage 102 aligned with plunger passage 92 and the check 104 retained by the plunger end in passage 102.

The outboard end of the dispensing tip may be of various shapes. Preferably, it has an outwardly converging 7° (FIG. 2) slight taper. Also, the outboard end contains grooves 108 extending from the dispensing passage exit opening 109 to the outer surface of the tip. This provides a relief passage so excess lubricant can escape when the volume of the lubricant exceeds the volume of the hole, e.g., when a blind hole is being serviced.

Figure 8:
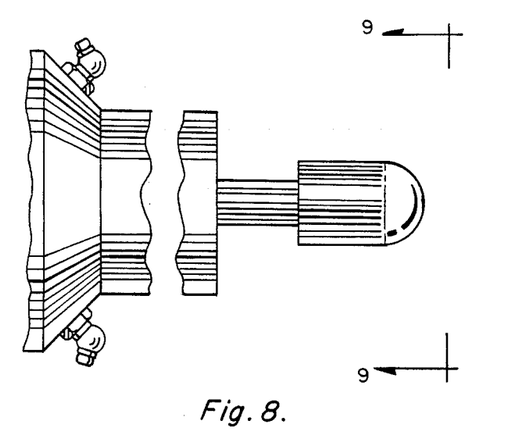
FIGS. 8 and 9 are side and end views of another embodiment of tip.
Figure 9:
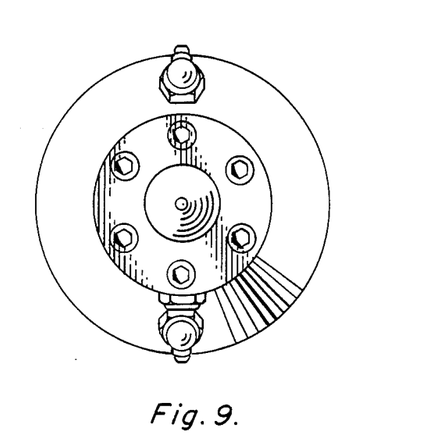
Figure 10:
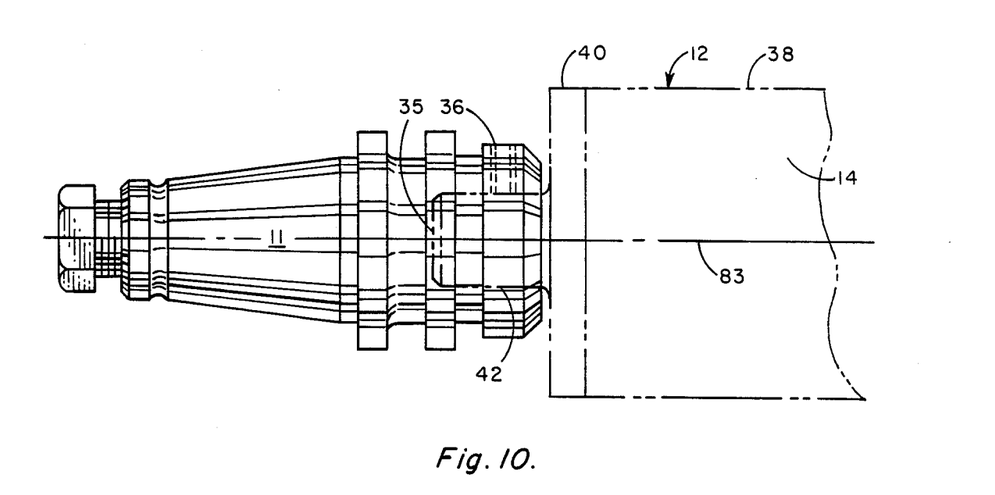
FIG. 10 shows a representative toolholder with the dispenser of the instant invention in ghostlines.

Another shape of tip 17 is shown in FIGS. 8 and 9 and have generally the same mechanical features. The end of the tip is hemispherical and may not have a relief groove but preferably does. The tip does not have to enter the hole—it merely has to contact the surface outside of the hole (e.g. FIG. 11).

A description of the operation follows: The instant apparatus 3 is filed in a tool store or matrix in a numerically controlled automatic toolchanger equipped machine tool. One or more holes 6 is/are to be drilled and then tapped. Servicing of only one hole will be described.

Figure 3:
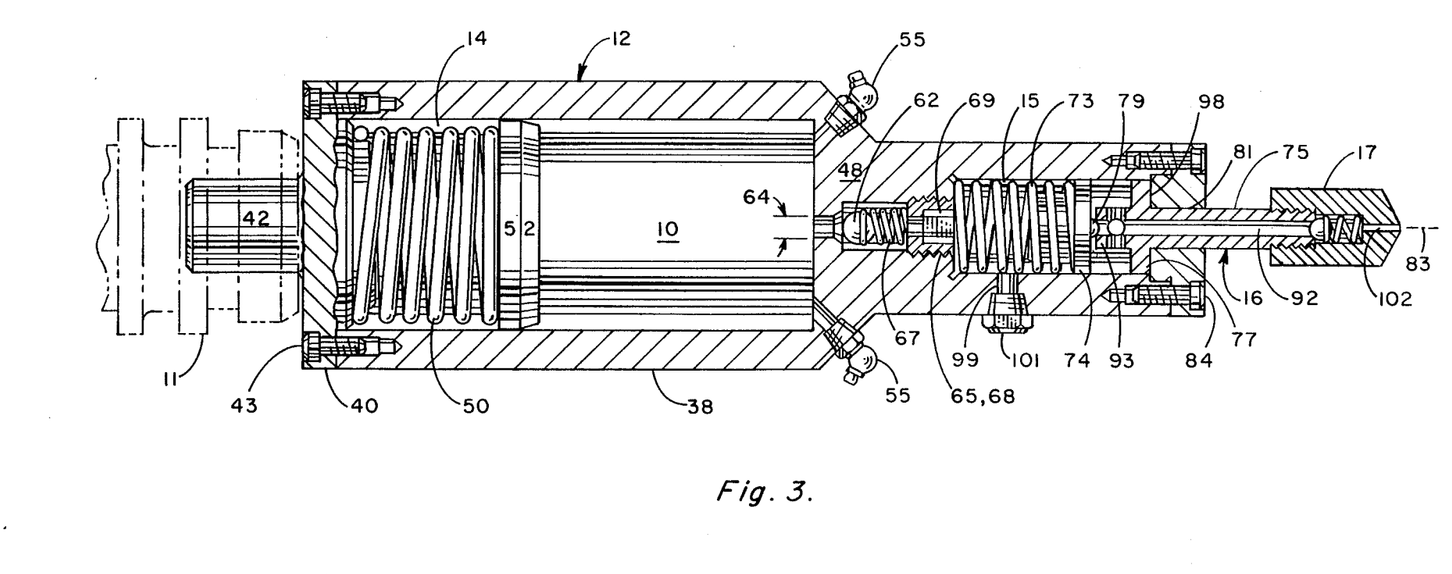

The reservoir 14 of the lubricator 3 is first filled completely with tapping lubricant 10 through the grease fitting 55 and filling passage 56 to the point where the reservoir spring 50 is substantially compressed and the piston 52 is driven to the left as seen in FIG. 3. Moreover, the filling pressure and/or spring 50 bias also urges the first check valve 62 open and fills the pump chamber 15 with lubricant 10 in the volume between check valve 62 and the pump piston 77. Pump spring 73 urges pump piston 77 against the pump cap. Compression of the respective check valve springs, especially that in the tip, has been adjusted so that at this time the tip check valve assembly 104 is in the FIGS. 2, 3 position—not opened under the pressure of filling from the reservoir.

The hole 6 is first drilled whereupon the NC toolchanger removes the drilling tool from the machine tool and replaces it as shown in FIG. 1 with the tapping lubricant dispenser 3 of the present invention. The NC system then brings together the workpiece 5 containing the hole 6 and the tapping lubricator 3: relative motion is indicated by the arrows 110 (FIG. 1 only). As noted, a drill program can be used for this inasmuch as the workpiece and tool have to be advanced toward each other with the axes of hole 6 and lubricator preferably coincident. When the tip 17 engages the outer surface of the workpiece adjacent hole 6—for instance as in FIGS. 4, 11—a very high pressure is built up in the pump chamber 15 because the pump piston 77 and the inner end of the plunger displace volume and push on the body of viscous lubricant 10 therein to shut first check valve 62 in the partition 48 and with the continued movement of the piston into the pump chamber the pressure continues to build until the tip check valve 104 is forced open and body of lubricant 10A is ejected into the hole 6.

It is preferred to let the machine tool spindle 4 continue to rotate during use of this lubricator. Thus, the entire lubricator is rotating during the aforesaid proceedings. However, the lubricator tip 17 ceases to rotate when it engages the workpiece but the rest of the lubricator 3 continues to rotate. Thus, there is relative rotation between the lubricator housing, etc. and the pump plunger and tip. Thus, the pump closure cap 80 must provide bearing support to the pump plunger for both rotation and sliding operation. Similarly, as to the engagement between the pump piston and the inner surfaces 114 of the pump chamber. So also some rotational as well as thrust support must be expressed by the pump thrust bearing. The tapping lubricant serves to lubricate the various bearings.

After the lubricant 10A has been ejected, the workpiece and lubricator are separated in response to the NC control program. This causes the tip check valve 104 to slam shut, thus preventing dribbling and unnecessary loss of lubricant. Rotation between the pump plunger and the remainder of the housing and pump stops in response to this separation—even though, as noted above, the spindle 4 may be continuing to rotate the entire lubricator 3. Further, at this time the reservoir spring 50 responds to the loss of lubricant from the pump chamber by expanding to push reloading piston 52, opening the first check valve 62 in the partition, and forcing lubricant 10 through the refilling passage into the pump chamber until the pump piston assumes its full position against the closure cap shoulder.

Although longer strokes and smaller quantity 10A are preferred, strokes of the plunger as short as 0.090 inches have been used. Reservoir capacity of 44 cubic inches has provided tapping compound sufficient for two shifts of unmanned operation without a refill but the unmanned running time is extremely variable and unpredictable overall, being dependent on number and size of holes.

At this point, the NC program can order a repeat of the above events to place lubricant in one or more additional holes or, alternatively, it can remove the lubricator to a tool store, replacing it with a tap and then proceed with a tapping operation.

What is claimed is:

1. An apparatus for applying a tapping lubricant from a dispenser into a hole to be tapped comprising a machine tool with a revolvable spindle, a tool store for storing a plurality of tools each having a toolholder, said dispenser being a tool in said store, and a numerically controlled automatic toolchanger;

said numerically controlled automatic toolchanger having means to remove said dispenser from said tool store, insert it in said spindle, manipulate it to dispense tapping lubricant and thereafter return said dispenser to the tool store;

said dispenser comprising toolholder means at one end of said dispenser for connection with said spindle;

pump plunger means at the other end of said dispenser with a dispensing end outermost;

an elongated housing extending between said toolholder and plunger that has walls defining therewithin a reservoir adjacent said toolholder means, a pump chamber adjacent said other end, and an exit passage between said reservoir and said pump chamber;

first valve means responsive to pressure increase in said pump chamber to close said exit passage;

reload biasing means for urging material out of said reservoir past said valve means through said exit passage and into said pump chamber;

said pump plunger means extending into said pump chamber through said housing for said dispensing end supported for rotation and reciprocation relative to said housing and having a length sufficient to permit reciprocation relative to said chamber while maintaining outside of said housing a portion of such length that includes said dispensing end at said other end;

that end of said pump plunger means within said pump chamber forming a pump piston to reciprocate with said plunger within said pump chamber;

a pump conduit within said plunger establishing communication between said dispensing end and said chamber upstream of said piston;

plunger biasing means for urging said pump plunger away from said toolholder; and second valve means disposed in said pump conduit, normally closed but openable in response to fluid pressure increase within said chamber.

2. An apparatus according to claim 1 wherein said dispenser further comprises a thrust bearing means within said chamber that includes said plunger biasing means for receiving thrust loads from said plunger.

3. An apparatus according to claim 2 wherein said thrust bearing means includes a perforate piston slidable in said chamber and disposed between said plunger biasing means and said plunger and for receiving rotary loads from said plunger.

4. An apparatus according to claim 1 further comprising a filling passage through said housing wall at that end of said reservoir adjacent said exit passage.

5. Apparatus according to claim 1 further comprising a dispensing tip at the end of said pump plunger means having radial grooves extending to its periphery from its exit passage.

6. An apparatus for applying tapping lubricant into a hole to be tapped by using a numerically controlled automatic toolchanger system to remove such apparatus from a tool store, insert it in a revolvable spindle, manipulate it to dispense tapping lubricant, and then return the apparatus to the tool store wherein the apparatus comprises:

toolholder means at one end of said apparatus for connecting with a toolholder which is insertable in the revolvable spindle of a machine tool;

elongated housing assembly secured to said toolholder and defining therewithin a reservoir adjacent said toolholder and a pump chamber at that end of the housing most remote from said toolholder and having a partition separating said pump chamber from said reservoir;

a reload passage through said partition connecting said reservoir to said pump chamber;

first check valve means disposed within said reload passage to prevent flow from said pump chamber into said reservoir;

a pump plunger means extending out of said pump chamber through said housing assembly;

a pump piston mounted on said pump plunger means within said pump chamber and engaging slidably the walls of said pump chamber;

a thrust bearing means engageable with the end of said pump plunger means disposed within said chamber that moves with said plunger means;

a dispensing tip secured on the outermost portion of said pump plunger means and outside of said chamber;

said pump plunger means having therewithin an exit passage communicating within said pump plunger means on the upstream side of said piston to the exit passage in said tip.

7. An apparatus according to claim 6 further comprising a check valve means disposed in one of said pump plunger exit passage or tip exit passage for normally opposing flow from within said pump chamber out through said tip.

8. Apparatus according to claim 6 further comprising as part of said thrust bearing a perforate piston disposed within said pump chamber adjacent one end of said pump plunger.

9. Apparatus according to claim 6 further comprising a perforate piston disposed within said pump chamber adjacent one end of said pump plunger, said thrust bearing connected between said pump plunger and said perforate piston, and means biasing said perforate piston and thrust bearing against said pump plunger means.

10. Apparatus according to claim 6 further comprising said thrust bearing means being disposed in said pump chamber to support said pump plunger for rotation and reciprocation relative to said pump chamber.

11. Apparatus according to claim 6 further comprising a dispensing tip at the end of said pump plunger means having radial grooves extending to its periphery from its exit passage.

* * * * *